F. C. HANSEN.
TRANSMISSION DEVICE FOR MOTOR VEHICLES.
APPLICATION FILED JUNE 11, 1917.
1,292,767.
Patented Jan. 28, 1919.
4 SHEETS—SHEET 1.
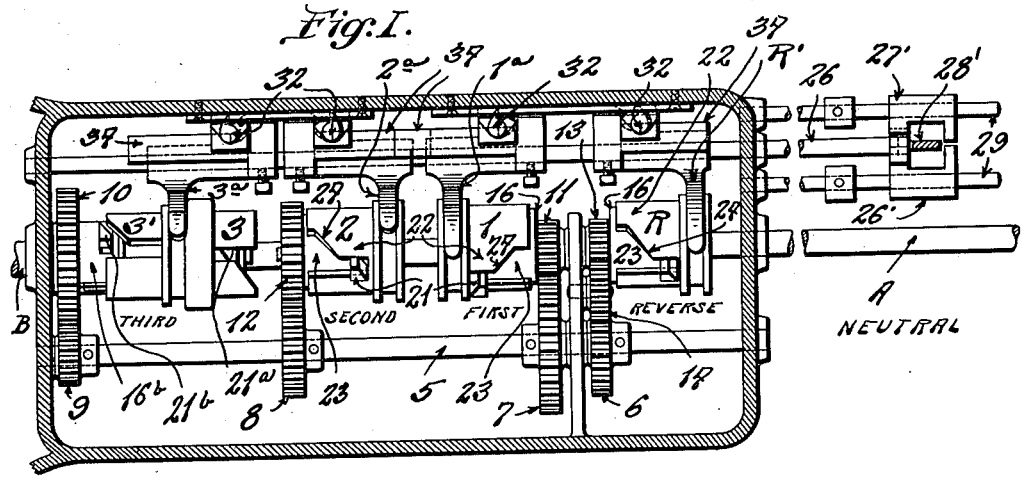
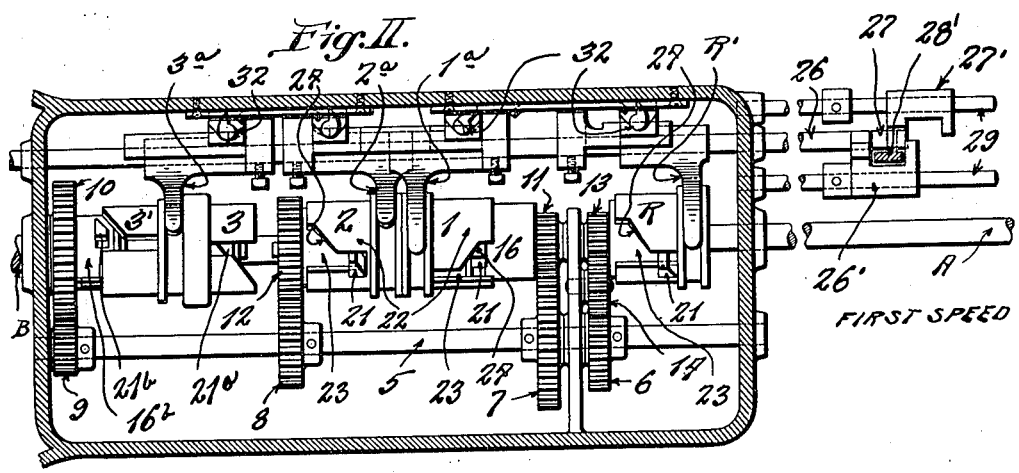
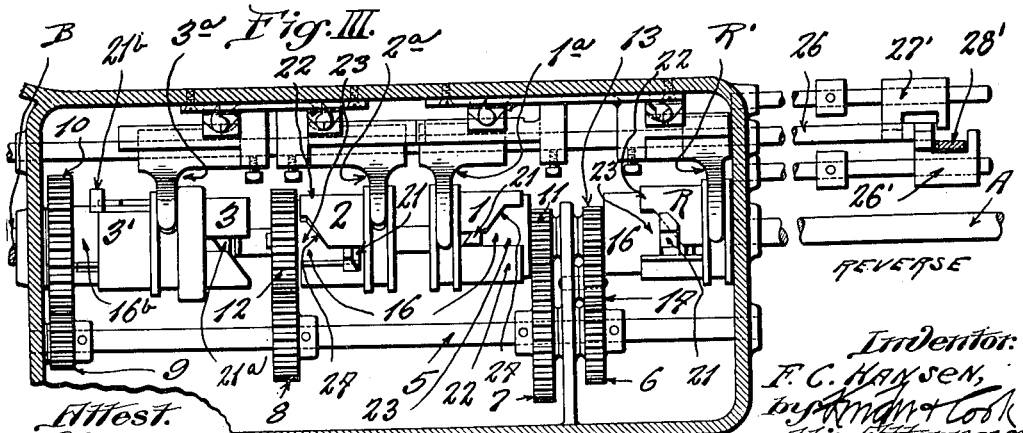
Attest.
Charles A. Becker.
Inventor:
F. C. Hansen,
by Inman & Cook
His Attorneys

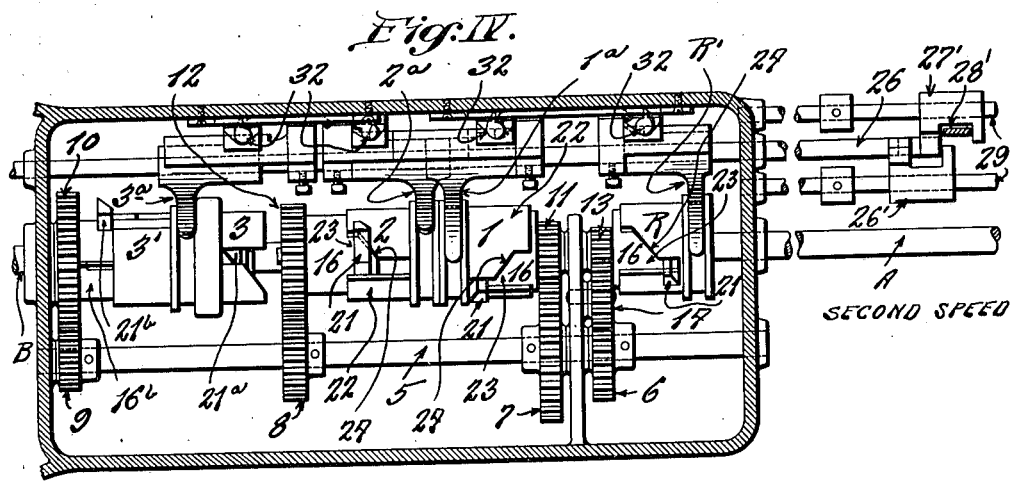
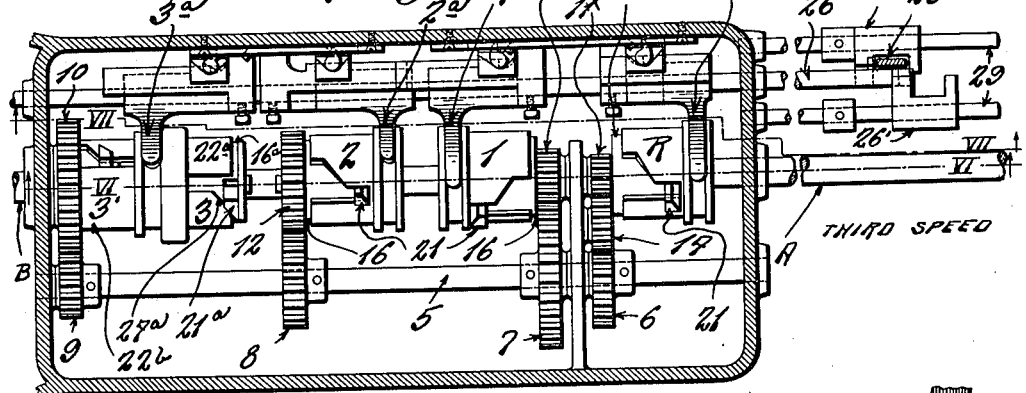
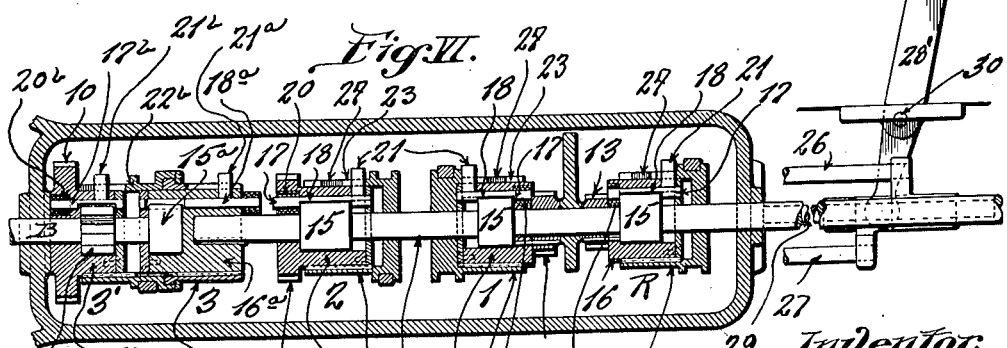

F. C. HANSEN.
TRANSMISSION DEVICE FOR MOTOR VEHICLES.
APPLICATION FILED JUNE 11, 1917.
1,292,767. Patented Jan. 28, 1919.
4 SHEETS—SHEET 3.
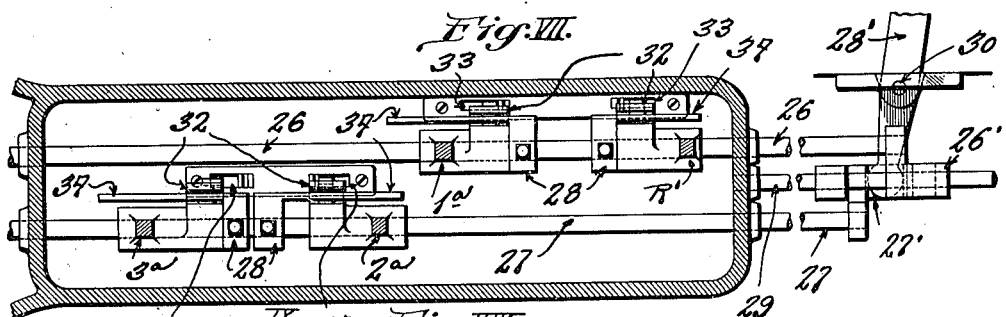
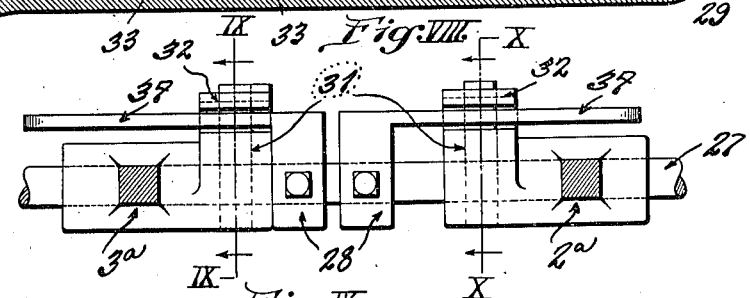
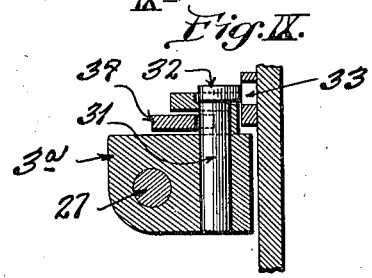
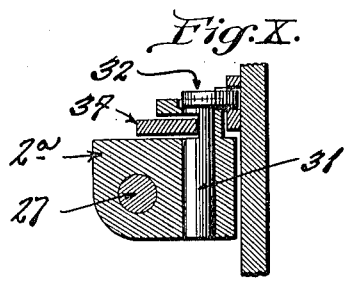
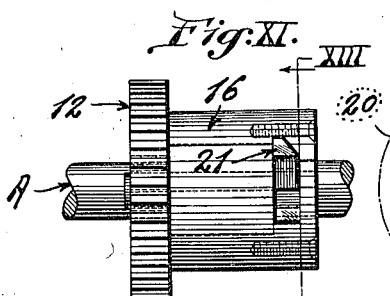
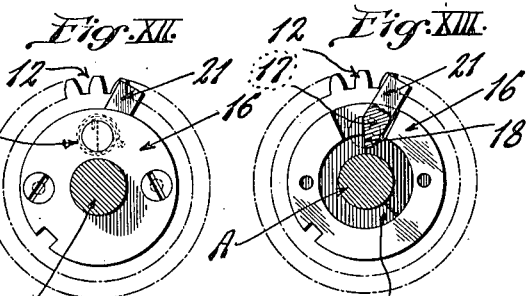
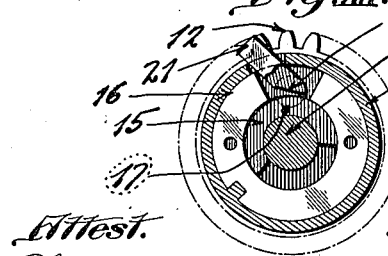
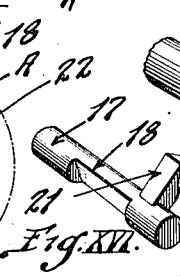
Attest.
Charles A. Becker.
Inventor:
F. C. Hansen,
by Knight & Cook
His Attorneys.

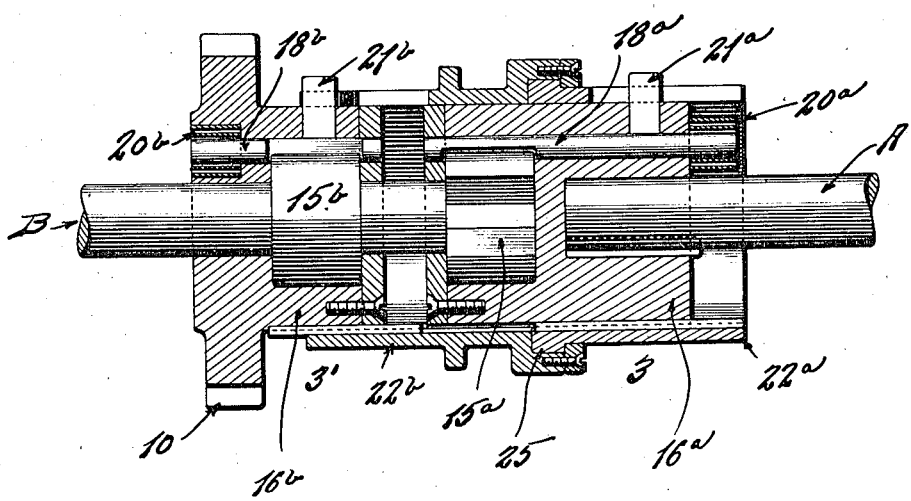
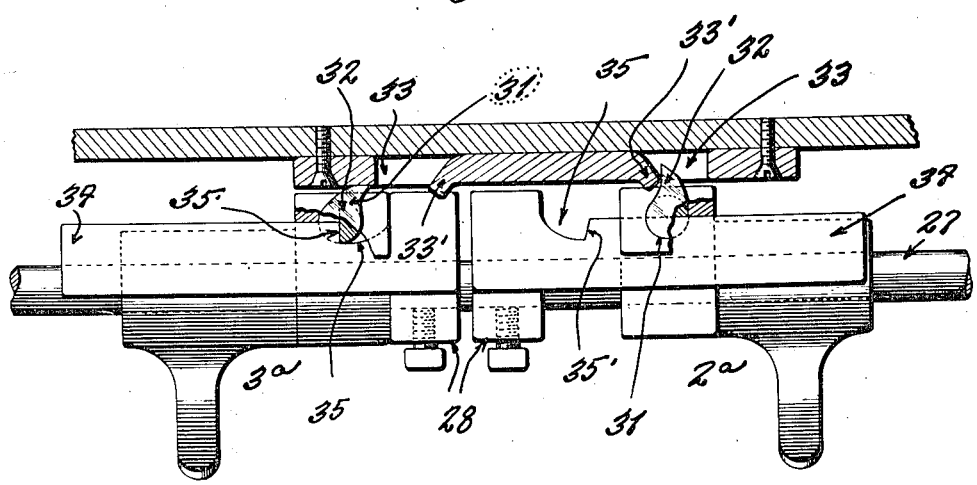

UNITED STATES PATENT OFFICE.

FREDERICK C. HANSEN, OF QUINCY, ILLINOIS, ASSIGNOR OF ONE-HALF TO EZRA BEST, OF QUINCY, ILLINOIS.

TRANSMISSION DEVICE FOR MOTOR-VEHICLES.

1,292,767.

Specification of Letters Patent.

Patented Jan. 28, 1919.

Application filed June 11, 1917. Serial No. 174,015.

*To all whom it may concern:*

Be it known that I, FREDERICK C. HANSEN, a citizen of the United States of America, a resident of Quincy, in the county of Adams, State of Illinois, have invented certain new and useful Improvements in Transmission Devices for Motor-Vehicles, of which the following is a full, clear, and exact description, reference being had to the accompanying drawings, forming a part of this specification.

My invention relates to improvements in transmission devices for motor vehicles, one of the objects being to eliminate the danger of stripping or otherwise injuring the transmission gears in changing from one speed to another. Another object is to eliminate the noise usually caused by shifting the gears of the ordinary transmission devices.

A further object of the invention is to produce a silent transmission device having speed-changing gears, all of which are disconnected from the rotating shafts when the drive shaft is connected directly to the driven shaft. The ordinary transmission device includes a transmission shaft, or countershaft, having a series of gears which turn idly and usually cause a humming or buzzing sound when the device is adjusted for high speed. The device herein shown is so constructed that the transmission shaft and all of the gear wheels will remain stationary, instead of turning idly, when the drive shaft is coupled directly to the driven shaft.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Briefly stated, the preferred form of the invention comprises trains of speed-changing gears through which motion is transmitted from a drive shaft to a driven shaft. The gears of each train are at all times in mesh with each other. They are not shifted into and out of engagement by the speed-changing lever. The preferred structure also includes a series of selective clutches whereby the different trains of speed-changing gears are coupled to and disconnected from the drive shaft. When the speed-changing lever occupies its neutral position all of the clutches just referred to are in their neutral positions, and the drive shaft can rotate freely without transmitting movement to the gearing. By manipulating the speed-changing lever, any one of the clutches may be selected and shifted to its operative position for the purpose of transmitting motion through a selected train of gearing. When the drive shaft is coupled directly to the driven shaft all of the gearing is uncoupled from both shafts, and power will then be transmitted without rotating any of the gear wheels.

Figure I is a horizontal section of a transmission device constructed in accordance with my invention, showing the parts in the positions they occupy when the operating lever is located in the neutral position.

Fig. II is a view similar to Fig. I, showing the parts adjusted for the first speed, or low speed.

Fig. III is a view similar to Fig. I showing the parts adjusted to reverse the direction of movement of the driven shaft.

Fig. IV is a view similar to Fig. I showing the parts adjusted for the second speed forward.

Fig. V is a similar view, showing the parts adjusted for the third speed.

Fig. VI is a vertical longitudinal section taken approximately on the line VI—VI, Fig. V, showing the drive shaft, the driven shaft and the clutches mounted on said shafts.

Fig. VII is a vertical longitudinal section taken approximately on the line VII—VII, Fig. V, showing the means for shifting the clutches.

Fig. VIII is an enlarged detail view of the shifters for the second and third speed clutches.

Fig. IX is a vertical section on the line IX—IX, Fig. VIII.

Fig. X is a vertical section on the line X—X, Fig. VIII.

Fig. XI is an enlarged detail view showing a portion of the drive shaft and one of the clutches mounted thereon, the clutch actuating sleeve being omitted.

Fig. XII is an end view of the parts shown in Fig. XI.

Fig. XIII is a section on the line XIII—XIII, Fig. XI, showing the clutch device in its operative position.

Fig. XIV is a view similar to Fig. XIII showing the clutch device in its neutral or ineffective position, the clutch actuating sleeve being shown in section.

Fig. XV is a detail view of one of the segmental clutch members on the drive shaft.

Fig. XVI is a detail view of the oscillatory clutch pin whereby movement is transmitted from one clutch member to the other.

Fig. XVII is an enlarged section showing the clutch for connecting the drive shaft directly to the driven shaft, and the clutch for disconnecting the gearing from the driven shaft, these clutches being actuated simultaneously.

Fig. XVIII is an enlarged plan view of the parts shown in Fig. VIII, also showing the keeper which coöperates with the clutch locking devices.

A designates a drive shaft, for example the crank shaft of an internal combustion engine. B designates a driven shaft, for example the propeller shaft of a motor vehicle. R, 1, 2 and 3, respectively, designate clutches on the drive shaft, and 3' designates a clutch on the driven shaft. The clutch R will be hereinafter termed a reversing clutch; the clutch 1 will be termed the first-speed clutch, clutch 2 the second-speed clutch, and the double clutch 3—3' will be termed the high-speed clutch. The clutches R, 1 and 2 may be actuated independently of each other to provide for the transmission of movement through different trains of gearing.

5 designates a countershaft, or transmission shaft, provided with gear wheels 6, 7, 8 and 9. 10 designates a gear wheel meshing with the wheel 9 to transmit movement from the shaft 5 to the driven shaft B. The gear wheel 10 is fixed to a part of the clutch 3', and the latter may be actuated to couple said wheel 10 to the driven shaft B, as will be hereinafter described. When any of the clutches are adjusted to transmit movement through the countershaft 5, the gear wheel 10 is coupled to the driven shaft B, but when the double clutch 3—3' is adjusted for high speed, the gear wheel 10 is released from the driven shaft to avoid the transmission of movement to the trains of gearing.

Before describing the details of the clutches and the clutch shifting devices, I will briefly describe the trains of gearing through which motion is transmitted from the clutches. A gear wheel 11, (Fig. II), fixed to the driven member of the first-speed clutch 1, meshes with the gear wheel 7 on the transmission shaft 5. When the first-speed clutch 1 is effective (Fig. II) motion is transmitted from the drive shaft A, through the clutch device 1 to the gear wheel 11, and thence through gear wheel 7, transmission shaft 5, gear wheels 9 and 10 to the clutch device 3' whereby the wheel 10 is coupled to the driven shaft B.

The second or intermediate speed is obtained by releasing the clutch 1 from the drive shaft and then coupling the clutch 2 with the drive shaft. Motion will then be transmitted through a gear wheel 12 fixed to the driven member of clutch 2 and meshing with a gear wheel 8 on the shaft 5.

When the device is adjusted to obtain the third-speed, or high speed, (Figs. V and VI), the clutch 3 is positioned to couple the drive shaft A to the driven shaft B, and the clutch 3' is positioned to release the gear wheel 10 from the driven shaft B. The drive shaft and driven shaft will then rotate at the same time speed and all of the gearing will remain stationary.

To reverse the direction of rotation of the driven shaft, the reversing clutch R is coupled to the drive shaft A (Fig. III) and motion is then transmitted through a gear wheel 13, secured to a part of the clutch R, to an idler gear 14, and thence through a gear wheel 6, transmission shaft 5, and pinion 9 to the gear wheel 10 on the driven shaft B.

Each of the clutches R, 1 and 2 (Fig. VI and Figs. XI to XV) comprises a segmental drive clutch member 15 fixed to the drive shaft A, a cylindrical driven clutch member 16 surrounding the segmental clutch member 15, and an oscillatory clutch pin 17 for transmitting movement from the drive clutch member 15 to the driven clutch member 16. The oscillatory clutch pin 17 is mounted in the cylindrical driven clutch member 16, and it may occupy the operative position shown in Fig. XIII, or the inoperative position shown in Fig. XIV. A portion of the clutch pin 17 is reduced in thickness, as shown at 18, to provide a recess in which the segmental member 15 can turn freely without transmitting movement to the driven clutch member 16. When the clutch pin 17 occupies the position shown in Fig. XIII, motion is transmitted from the drive shaft A, through the segmental clutch member 15 to the clutch pin 17, and thence to the driven clutch member 16. Therefore, when the clutch pin 17 occupies the operative position shown in Fig. XIII motion will be transmitted from the drive shaft A, through the clutch device to the gear wheel 11, 12 or 13 fixed to the driven member of the clutch.

When the clutch pin 17 is turned to the inoperative position shown in Fig. XIV, the segmental clutch member 15 will turn freely in the recessed portion 18 of the clutch pin without transmitting movement through the clutch.

The means for actuating the clutch pin 17 (Figs. VI and XII) comprises a spiral spring 20 fixed at one end to the clutch pin 17 and having its opposite end attached to the cylindrical clutch member 16. This spring tends to move the clutch pin 17 to the operative position shown in Figs. XII and XIII. An operating finger 21, extending from the clutch pin 17, extends through a slot in the driven clutch member 16 and projects beyond the periphery of said driven clutch member. 22 designates a shiftable clutch actuating sleeve splined to the driven clutch member 16 and provided with a recess 23 for the reception of the finger 21 which extends from the clutch pin 17. Each actuating sleeve 22 is also provided with a cam face 24 (Figs. I and VI) adapted to engage the finger 21 for the purpose of shifting the clutch pin to its inoperative position. In Fig. II the clutches R and 2 are uncoupled from the drive shaft, the fingers 21 forming part of said clutches being confined in the reduced portions of the recesses 23, and the clutch pins 17 fixed to said fingers being in the inoperative position shown in Fig. XIV. The clutch 1, shown in Fig. II, is coupled to the drive shaft, and its operating finger 21 is therefore located in the wide part of the recess 23, allowing the spiral spring 20 to retain the clutch pin in its operative position, as shown most clearly in Figs. XII and XIII. When the actuating sleeve 22 of the clutch 1 is shifted to the right from the position shown in Fig. II, the cam face 24 will engage the adjacent finger 21 with the result of turning the clutch pin to the inoperative position, shown most clearly in Figs. VI and XIV.

It will now be understood that each of the clutches R, 1 and 2 includes a segmental drive clutch member 15 fixed to the drive shaft, a cylindrical driven clutch member 16 mounted on said member 15, a clutch pin 17 for transmitting movement from the segmental clutch member to the cylindrical clutch member, a spiral spring 20 tending to move the clutch pin to its operative position, and a shifting device including a sleeve 22 splined to the cylindrical clutch member 16 for the purpose of moving the clutch pin to its inoperative position. The clutches R, 1 and 2 may be shifted independently of each other, as will be hereinafter described, to provide for the transmission of movement through a selected train of gearing.

The high speed clutch device 3—3′ (Figs. V, VI and XVII) is a double structure consisting of a clutch 3 for coupling the drive shaft A directly to the driven shaft B, and a clutch 3′ for coupling the gear wheel 10 to the driven shaft B. These clutches are so similar to the clutches already described that a complete description of their details is deemed unnecessary. However, the clutches 3 and 3′ will be briefly described. The clutch 3 comprises a cylindrical drive member $16^a$ fixed to the drive shaft A, a segmental driven clutch member $15^a$ fixed to the driven shaft B, a clutch pin $18^a$ for transmitting movement from the clutch member $16^a$ to the clutch member $15^a$, an operating finger $21^a$ extending from the clutch pin $18^a$, and a shiftable actuating sleeve $22^a$ splined to the clutch member $16^a$. The shiftable sleeve $22^a$ has a cam face $24^a$ (Fig. V) adapted to engage the finger $21^p$ so as to shift the clutch pin $18^a$ to the inoperative position shown in Fig. XVII. A spring $20^a$ tends to retain the clutch pin $18^a$ in the operative position shown in Fig. VI.

The clutch 3′ comprises a segmental driven clutch member $15^b$ (Figs. VI and XVII) fixed to the driven shaft B, a cylindrical clutch member $16^b$ surrounding said segmental member, a clutch pin $18^b$ for transmitting movement from the clutch member $16^b$ to the segmental member $15^b$. The function of this clutch is to transmit movement from the gear wheel 10 to the driven shaft B, and to uncouple these parts when the power is transmitted through the clutch 3. The clutch 3′ also includes an operating finger $21^b$ extending from the clutch pin $18^b$, and a shiftable actuating sleeve $22^b$ splined to the clutch member $16^b$ as shown most clearly in Fig. XVII. A spring $20^b$ tends to turn the clutch pin $18^b$ to the operative position shown in Fig. XVII, and the shiftable sleeve $22^b$ may be actuated to shift said clutch pin $18^b$ to the inoperative position shown in Fig. VI.

The shiftable sleeve $22^a$ (Fig. XVII) has an annular flange 25 which lies in an annular groove in the shiftable sleeve $22^b$. The sleeves are thus interlocked with each other and they may be shifted simultaneously for the purpose of releasing one of the clutches and at the same time placing the other clutch in its operative position. When one of these companion clutches 3—3′ occupies its operative position, the other occupies its inoperative position. When the transmission device is adjusted for first-speed, second-speed, reverse, or neutral, the double clutch 3—3′ is adjusted as shown in Fig. XVII, and the drive clutch member $16^a$ can then turn freely without transmitting movement to the driven clutch member $15^a$. However, motion can be transmitted from the gear wheel 10 to the driven shaft B. When the double clutch 3—3′ is adjusted for the third-speed (high speed) as shown in Fig. VI, motion is transmitted from the drive shaft A, through the clutch 3 to the driven shaft B, and the latter then rotates independently of the gear wheel 10.

The means for selecting and shifting the different clutches comprises a shifter R' fitted to the reversing clutch R, a shifter 1ª fitted to the first-speed clutch 1, a shifter 2ª fitted to the second-speed clutch 2, and a shifter 3ª fitted to the high-speed clutch. Each of these shifters is provided with a forked arm which lies in an annular groove in the shiftable actuating sleeve with which it is associated. All of the shifters are under the control of an operating lever 28' which may be operated as will be hereinafter described for the purpose of selecting and shifting the clutches. The shifters 1ª and R' are loosely mounted on a shift rod 26 (Fig. VII), the shifters 2ª and 3ª being loosely mounted on a shift rod 27. Abutment collars 28, fixed to the shift rods, are adapted to engage the respective shifters. Recessed blocks 26' and 27' (Figs. I and VII), loosely mounted on stationary guide rods 29, are fixed to the shift rods 26 and 27, respectively. The operating lever 28' is loosely pivoted at 30, and its lower end may be inserted into either of the recessed blocks 26' or 27', for the purpose of transmitting movement to a selected clutch shifter. When the operating lever 28' occupies the neutral position, shown in Fig. I, all of the clutches (excepting the clutch 3') occupy their inoperative positions. This operating lever may be shifted from the neutral position (Fig. I) to either of four different positions, with the result of shifting a selected clutch to its operative position. For example, the operating lever 28' may be adjusted to the position shown in Fig. II so as to actuate the shift rod 26, thereby moving the clutch shifter 1ª to its operative position. To accomplish this the shift rod 26 is moved to the left from the position shown in Fig. VII, thereby forcing one of the abutment collars 28 into engagement with the clutch shifter 1ª and causing said shifter to move with the rod 26. Obviously this can be accomplished without moving any of the other clutch shifters. When the operating lever 28' is adjusted for the third-speed (high-speed) the clutch shifters occupy the positions shown in Figs. V to X, inclusive, and also shown in Fig. XVIII. The clutches R, 1 and 2 then occupy their neutral or ineffective positions, and the clutch shifter 3ª is shifted to its operative position. It is to be understood that the shifter 3ª was actuated by transmitting movement from the operating lever 28' to the shift rod 27, thus forcing one of the abutment collars 28 into engagement with the shifter 3ª so as to move the latter to the left from its neutral position.

I will now describe the latch devices whereby the shifters are locked in their neutral positions. These latch devices also serve as means for transmitting movement in restoring the shifters to their neutral positions.

Each of the shifters R', 1ª, 2ª and 3ª has an extension provided with a vertical latch pin 31 to which a latch dog 32 is secured. When a shifter occupies the position shown in Fig. X and at the right hand portions of the Figs. VIII and XVIII, its latch dog 32 lies in a recess 33 in a keeper bar, and a latch bar 34 coöperates with a reduced flattened portion of the latch pin 31 to retain the latch dog in the recess 33. The shifter and the clutch associated therewith are thus locked in their neutral or ineffective positions. Figs. V to X and Fig. XVIII show the shifters 2ª and 3ª in the positions they occupy when the device is adjusted for the third-speed, the shifter 2ª being locked to retain its clutch 2 in an inoperative condition, and the shifter 3ª being adjusted to locate its clutch in the high-speed position. It will be observed that each latch bar 34 has a recess or notch 35, and that one of these notches registers with the reduced flattened portion of the latch pin 31 of the shifter 3ª. In restoring this shifter 3ª, the shift rod 27 and the latch bars 34 carried thereby are pulled to the right (Fig. XVIII). A shoulder 35' on one of the latch bars 34 then engages the flattened portion of the latch pin in the shifter 3ª, to move the latter with the latch bar. When the latch dog 32 of the shifter 3ª engages the adjacent lug 33', said latch dog turns on its axis and enters a recess 33 in the stationary keeper bar. The latch bar continues in motion for a slight distance to coöperate with the flattened portion of the latch pin, thereby retaining the latch dog in the keeper.

In changing from the third-speed to the second-speed, the shift rod 27 is pulled to the right (Fig. XVIII) a distance great enough to restore the shifter 3ª to the neutral position, thereafter continuing in motion to unlock the shifter 2ª and shift it from the neutral position. To move the shifter 2ª, one of the abutment collars 28, fixed to shift rod 27, strikes said shifter and at this time the recess 35 in a latch bar 34 registers with the reduced flattened portion of the latch pin 31 in said shifter, allowing the latch pin to turn in the shifter. The latch is thus unlocked and the shifter 2ª can then move to the right with the shift rod 27, thereby coupling the clutch 2 to the drive shaft. While the shifter 2ª is moving to the right its companion shifter 3ª is locked in the neutral position by the latch dog 32 in said shifter 3ª. To clearly understand the action of the shifters and shift rods, the following features must be remembered.

The shifters are loosely mounted on the shift rods. The abutment collars 28 are fixed to the shift rods for the purpose of moving the shifters away from the neutral positions. The latch bars 34, carried by the abutment collars 28, coöperate with the latch pins 31 to restore the shifters to the neutral positions. When one shifter is thrown from the neutral position, as shown at the left side of Fig. XVIII, its companion shifter is locked as shown at the right side of Fig. XVIII.

It is to be understood that any of the shifters may be selected and shifted from its neutral position, and in changing from one speed to another it is necessary to restore the operating lever to its neutral position before the selected shifter can be actuated. In other words, it is necessary to restore the effective clutch to its neutral or ineffective condition before another clutch can be placed in its operative condition.

I claim:—

1. The combination of a drive shaft, a driven shaft, a transmission device including speed-changing gears and selective clutches combined with said speed-changing gears to transmit power from said drive shaft to said driven shaft, each clutch being associated with one of the speed-changing gears, and the clutches being movable independently of each other to provide for the transmission of power through different gears, means for locking all of the clutches in their neutral positions, and operating means including an operating member whereby any one of the clutches may be selected, unlocked and shifted to its operative position.

2. The combination of a drive shaft, a driven shaft, a transmission device including speed-changing gears and selective clutches combined with said speed-changing gears to transmit power from said drive shaft to said driven shaft, each clutch being associated with one of the speed-changing gears and the clutches being movable independently of each other to provide for the transmission of power through different gears, clutch shifting arms associated with the clutches, an operating handle, shift rods for transmitting movement from said operating handle to said clutch shifting arms, latch bars carried by said shift rods, latches movable with the clutch shifting arms, and a keeper adapted to receive the latches, said latch bars being adapted to coöperate with the latches to lock the clutches in their neutral positions.

3. The combination of a drive shaft, a driven shaft, and a transmission device including a transmission shaft, speed-changing gears, selective clutches combined with said transmission shaft and speed-changing gears to transmit power from said drive shaft to said driven shaft, said selective clutches including a clutch through which motion is transmitted from the gears to the driven shaft and a clutch for coupling the driven shaft directly to the drive shaft, one of the two last mentioned clutches being in its operative position when the other occupies its inoperative position, and a shifter comprising a double cam sleeve surrounding both of the last mentioned clutches and cam actuated clutch shifting members coöperating with the cams on said sleeve whereby both clutches are operative simultaneously to disconnect the gearing from the driven shaft and to connect the drive shaft directly to the driven shaft.

In testimony that I claim the foregoing I hereunto affix my signature.

FREDERICK C. HANSEN